(12) United States Patent
Zheng

(10) Patent No.: US 9,729,532 B2
(45) Date of Patent: Aug. 8, 2017

(54) USER IDENTITY AUTHENTICATING METHOD AND DEVICE FOR PREVENTING MALICIOUS HARASSMENT

(71) Applicant: ZTE Corporation, Shenzhen, Guangdong (CN)

(72) Inventor: Wei Zheng, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 132 days.

(21) Appl. No.: 14/427,528

(22) PCT Filed: Sep. 4, 2013

(86) PCT No.: PCT/CN2013/081942
§ 371 (c)(1),
(2) Date: Apr. 7, 2015

(87) PCT Pub. No.: WO2014/040479
PCT Pub. Date: Mar. 20, 2014

(65) Prior Publication Data
US 2015/0244698 A1     Aug. 27, 2015

(30) Foreign Application Priority Data

Sep. 12, 2012 (CN) .......................... 2012 1 0336371

(51) Int. Cl.
*H04L 29/06*     (2006.01)
*H04W 4/14*      (2009.01)
(Continued)

(52) U.S. Cl.
CPC ............ *H04L 63/08* (2013.01); *H04L 9/3226* (2013.01); *H04L 63/0853* (2013.01);
(Continued)

(58) Field of Classification Search
None
See application file for complete search history.

(56) References Cited

U.S. PATENT DOCUMENTS

2004/0019564 A1 * 1/2004 Goldthwaite .......... G06Q 20/04
                                                              705/44
2007/0107050 A1 * 5/2007 Selvarajan .............. G06F 21/31
                                                              726/5
(Continued)

FOREIGN PATENT DOCUMENTS

CN      1394032 A      1/2003
CN      1784063 A      6/2006
(Continued)

OTHER PUBLICATIONS

Tanaka, Michiru and Teshigawara, Yoshimi. A Method and Its Usability for User Authentication . . . Mobile Phones. WISA'06 Proceedings: Part I, pp. 225-236 [online], Aug. 28, 2006 [retrieved on Aug. 2, 2016]. Retrieved from the Internet:< URL: http://link.springer .com/chapter/10.1007%2F978-3-540-71093-6_18#page-1 >.*

(Continued)

*Primary Examiner* — Malcolm Cribbs
(74) *Attorney, Agent, or Firm* — Oppedahl Patent Law Firm LLC

(57) ABSTRACT

A user identity authenticating method and device for preventing malicious harassment are described. The method includes: after a user logs in an internet website, unique first authentication code information is generated and stored; the first authentication code information and a Short Message (SMS) Uplink (UL) service number used for identifying the internet website uniquely are displayed on a website page; after the user sends an SMS including second authentication code information input by the user to the corresponding SMS UL service number, an acquired second authentication (Continued)

code is matched with a stored first authentication code, if the matching succeeds, then the authentication succeeds. The embodiments in the disclosure can avoid possible malicious harassment effectively, thus avoiding legal risks which a website service provider may confront to some extent, and improving the satisfaction of its service. In addition, the increase of processing load and performance influence of the website service provider's server, which are caused by triggering the sending of a large number of authentication codes maliciously, can be avoided in the disclosure.

18 Claims, 2 Drawing Sheets

(51) Int. Cl.
    *H04W 12/06*     (2009.01)
    *H04L 9/32*     (2006.01)
    *G06F 21/31*     (2013.01)

(52) U.S. Cl.
    CPC .......... *H04L 63/1466* (2013.01); *H04L 63/18* (2013.01); *H04W 4/14* (2013.01); *H04W 12/06* (2013.01); *G06F 21/313* (2013.01); *H04L 63/0838* (2013.01); *H04L 63/1483* (2013.01)

(56) References Cited

U.S. PATENT DOCUMENTS

| | | | |
|---|---|---|---|
| 2007/0123224 A1* | 5/2007 | Nishiyama | H04M 3/4931 455/414.1 |
| 2007/0203850 A1* | 8/2007 | Singh | G06Q 20/327 705/67 |
| 2007/0220275 A1 | 9/2007 | Heitzeberg | |
| 2009/0106138 A1* | 4/2009 | Smith | G06Q 20/385 705/35 |
| 2009/0235346 A1* | 9/2009 | Steinberg | G06F 21/445 726/8 |
| 2009/0328186 A1* | 12/2009 | Pollutro | G06F 21/31 726/13 |
| 2010/0100725 A1* | 4/2010 | Ozzie | G06F 21/43 713/155 |
| 2010/0100945 A1* | 4/2010 | Ozzie | G06F 21/35 726/5 |
| 2010/0241857 A1 | 9/2010 | Okude | |
| 2011/0026716 A1* | 2/2011 | Tang | G06F 21/43 380/284 |
| 2011/0029436 A1* | 2/2011 | Norvell | G06F 21/31 705/67 |
| 2011/0072499 A1* | 3/2011 | Lin | G06F 21/35 726/6 |
| 2011/0219427 A1* | 9/2011 | Hito | G06F 21/00 726/3 |
| 2011/0265149 A1* | 10/2011 | Ganesan | H04L 9/3226 726/4 |
| 2012/0122497 A1* | 5/2012 | Huang | H04L 63/123 455/466 |
| 2013/0111208 A1* | 5/2013 | Sabin | G06F 21/35 713/171 |
| 2013/0132717 A1* | 5/2013 | Brand | H04L 9/0825 713/156 |
| 2013/0276078 A1* | 10/2013 | Rockwell | G06F 21/43 726/7 |

FOREIGN PATENT DOCUMENTS

| | | |
|---|---|---|
| CN | 101087193 A | 12/2007 |
| CN | 101771684 A | 7/2010 |
| DE | 102009057800 A1 | 6/2011 |
| WO | 2011069492 A1 | 6/2011 |
| WO | 2012004640 A1 | 1/2012 |
| WO | 2014122614 A2 | 8/2014 |

OTHER PUBLICATIONS

International Search Report in international application No. PCT/CN2013/081942, mailed on Dec. 12, 2013.
English Translation of the Written Opinion of the International Search Authority in international application No. PCT/CN2013/081942, mailed on Dec. 12, 2013.
Supplementary European Search Report in European application No. 13836542.4, mailed on Oct. 15, 2015.

* cited by examiner

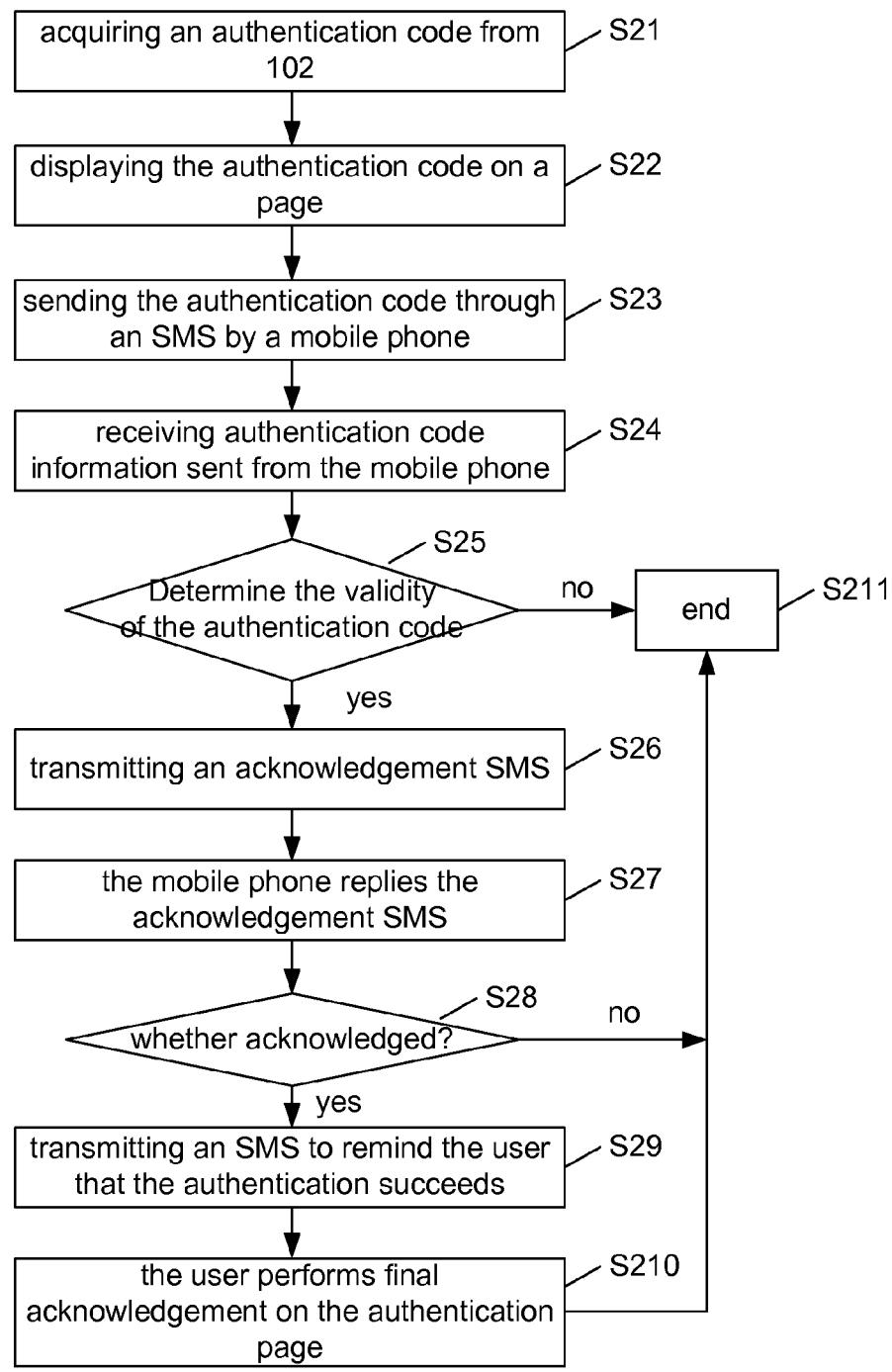

USER IDENTITY AUTHENTICATING METHOD AND DEVICE FOR PREVENTING MALICIOUS HARASSMENT

TECHNICAL FIELD

The disclosure relates to the field of computer internet and mobile communication technology, in particular to a user identity authenticating method and device for preventing malicious harassment.

BACKGROUND

At present, with the increasing development of internet applications and the growing popularity of mobile phones, more and more internet applications use mobile phone numbers as login identifiers or apply mobile phone Short Messages (SMS) for message notification. In this case, an internet user needs to provide a real mobile phone number while an internet service provider needs to perform authentication according to the mobile phone number provided by the user.

The related mobile phone number authentication method includes: a user logs in an internet website and provides a mobile phone number; after the user clicks a button for sending an authentication code, an internet service provider sends an SMS including authentication code information to the corresponding mobile phone number; then the user inputs the authentication code received by the mobile phone of the user within a corresponding valid time period, and clicks a submit button to complete the authentication process.

However, there is a problem existing in this method: if other users input mobile phone numbers of other people maliciously for many times to perform authentication, many SMSs including authentication codes will be received accordingly, which will cause harassment to other people to some extent and those who are harassed may complain or even take legal actions to protect their rights in serious cases, thus internet service providers will confront relatively high legal risks. In addition, when the internet service providers need to send a large number of authentication codes because of the mobile phone numbers input maliciously, server processing load will be also increased and server performance will be influenced. Therefore, how to provide a user identity authenticating method capable of preventing malicious harassment of other users more effectively is a problem that needs to be solved by internet service providers currently.

SUMMARY

In view of this, the main purpose of the embodiments of the disclosure is to provide a user identity authenticating method and device for preventing malicious harassment.

To realize the purpose of the embodiments of the disclosure, the following technical solution is applied:

on one hand, a user identity authenticating method for preventing malicious harassment, in an embodiment of the disclosure, which includes:

after a user logs in an internet website, generating unique first authentication code information and storing it;

displaying the first authentication code information and a Short Message (SMS) Uplink (UL) service number used for identifying the internet website uniquely on a website page;

after the user sends an SMS including second authentication code information input by the user to the corresponding SMS UL service number, matching an acquired second authentication code with a stored first authentication code, if the matching succeeds, the authentication succeeds.

In a preferred embodiment, the generating the unique first authentication code information and storing it after the user logs in the internet website may include:

after the user logs in the internet website, generating a unique session identifier accordingly and putting it into website Cookie, and generating an authentication code request command;

according to the command, the session identifier, a preset expiration time threshold and an authentication code request command serial number, generating the unique first authentication code based on an authentication code generating algorithm, and storing the first authentication code together with the corresponding session identifier and the expiration time threshold information.

In a preferred embodiment, the displaying the first authentication code information on the website page may include: displaying the first authentication code information in the form of a text, or in the form of a Quick Response (QR) code image.

In a preferred embodiment, after the user sends the SMS including the second authentication code information input by the user to the corresponding SMS UL service number, the matching the acquired second authentication code with the stored first authentication code may include:

after the user inputs the second authentication code information manually according to display information on the website page or inputs the second authentication code information according to scanning the QR code image, sending the SMS including the second authentication code information to the corresponding SMS UL service number;

matching the second authentication code with the stored first authentication code, if the matching succeeds, determining whether a user identity authentication duration exceeds the expiration time threshold; if the user identity authentication duration is within its validity, the authentication succeeds.

In a preferred embodiment, the user identity authenticating method for preventing malicious harassment may further include:

sending an identity authentication acknowledgment SMS to a user mobile phone number;

according to acquired acknowledgment information replied by the user, associating and storing the user mobile phone number with the unique session identifier of the identity authentication, and sending an identify authentication success SMS to the user mobile phone number.

On the other hand, a user identity authenticating device for preventing malicious harassment, in an embodiment of the disclosure, which includes:

an authentication page module, which is configured to provide an internet website page for a user; and to display first authentication code information acquired from an authentication code generating module and a Short Message (SMS) Uplink (UL) service number used for identifying the internet website uniquely on the website page;

the authentication code generating module, which is configured, after the user logs in the internet website, to generate the unique first authentication code information and to store it;

an authentication code receiving module, which is configured, after the user sends an SMS including second authentication code information input by the user to the corresponding SMS UL service number, to acquire the second authentication code information fed back by the user;

an authentication execution module, which is configured to match the acquired second authentication code information with a stored first authentication code, if the matching succeeds, the authentication succeeds.

In a preferred embodiment, the authentication code generating module may be further configured, after the user logs in the internet website, to generate a unique session identifier accordingly and put it into website Cookie, and to generate an authentication code request command;

according to the command, the session identifier, a preset expiration time threshold and an authentication code request command serial number, to generate the unique first authentication code based on an authentication code generating algorithm, and to store the first authentication code together with the corresponding session identifier and the expiration time threshold information.

In a preferred embodiment, the displaying the first authentication code information on the website page by the authentication page module may include: displaying the first authentication code information in the form of a text, or in the form of a QR code image.

In a preferred embodiment, after the user inputs the second authentication code information manually according to display information on the website page or inputs the second authentication code information according to scanning the QR code image, and sends the SMS including the second authentication code information to the corresponding SMS UL service number, the authentication code receiving module may be configured to acquire the second authentication code information fed back by the user;

and the authentication execution module may be further configured to match the second authentication code with the stored first authentication code, if the matching succeeds, to determine whether a user identity authentication duration exceeds the expiration time threshold; if the user identity authentication duration is within its validity, the authentication succeeds.

In a preferred embodiment, the user identity authenticating device for preventing malicious harassment may further include:

an acknowledgment SMS sending module, which is configured, after the identity authentication succeeds, to send an identity authentication acknowledgment SMS to a user mobile phone number; and after the acknowledgment SMS receiving module acquires acknowledgment information replied by the user, to send an identify authentication success SMS to the user mobile phone number;

an acknowledgment SMS receiving module, which is configured to acquire the acknowledgment information replied by the user, and to associate and store the user mobile phone number with the unique session identifier of the identity authentication.

It can be learned from the technical solution of the embodiments of the disclosure that, application of the embodiments of the disclosure can avoid possible malicious harassment effectively, thus avoiding legal risks which a website service provider may confront to some extent, and improving the satisfaction of its service. In addition, the increase of processing load and performance influence of the website service provider's server, which are caused by triggering the sending of a large number of authentication codes maliciously, can be avoided.

BRIEF DESCRIPTION OF THE DRAWINGS

FIG. 3 is a schematic diagram illustrating a working process of a user identity authenticating device for preventing malicious harassment in an embodiment of the disclosure.

The purpose implementation, functional features and excellent effects of the disclosure will be further described hereinafter in conjunction with specific embodiments and the drawings.

DETAILED DESCRIPTION

The technical solution of the disclosure will be further described in details below in conjunction with the drawings and specific embodiments to enable those skilled in the art to better understand and implement the disclosure. However, the embodiments illustrated herein are not used as limitation to the disclosure.

Figure 1:
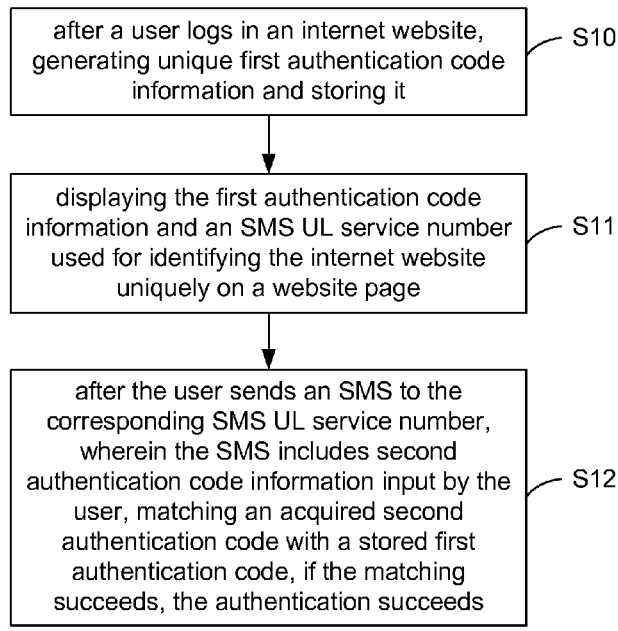
FIG. 1 is a flowchart of a user identity authenticating method for preventing malicious harassment in an embodiment of the disclosure.

As shown in FIG. 1, a user identity authenticating method for preventing malicious harassment in an embodiment of the disclosure includes the following steps:

Step 10: after a user logs in an internet website, generating unique first authentication code information and storing it;

Step 11: displaying the first authentication code information and an SMS UL service number used for identifying the internet website uniquely on a website page, e.g. in a preferred embodiment, a method for displaying the first authentication code information on the website page includes: displaying the first authentication code information in the form of a text (Chinese characters, English letters, Arabic numerals and characters of other languages etc.) or in the form of a QR code image;

Step 12: after the user sends an SMS to the corresponding SMS UL service number, wherein the SMS includes second authentication code information input by the user, matching an acquired second authentication code with a stored first authentication code, if the matching succeeds, the authentication succeeds.

In a preferred embodiment, the step of generating the unique first authentication code information and storing it after the user logs in the internet website includes:

Step 101: after the user logs in the internet website, generating a unique session identifier accordingly and putting it into website Cookie, and generating an authentication code request command;

Step 102: according to the command, the session identifier, a preset expiration time threshold and an authentication code request command serial number, generating the unique first authentication code based on an authentication code generating algorithm, and storing the first authentication code together with the corresponding session identifier and the expiration time threshold information.

In a preferred embodiment, after the user sends the SMS to the corresponding SMS UL service number, wherein the SMS includes the second authentication code information input by the user, the step of matching the acquired second authentication code with the stored first authentication code includes:

Step 121: after the user inputs the second authentication code information manually according to display information on the website page or inputs the second authentication code information according to scanning the QR code image, sending the SMS including the second authentication code information to the corresponding SMS UL service number;

Step 122: matching the second authentication code with the stored first authentication code, if the matching succeeds, determining whether a user identity authentication duration exceeds the expiration time threshold; if the user identity authentication duration is within its validity, the authentication succeeds.

In a more preferred embodiment, after executing the steps of "matching the second authentication code with the stored first authentication code, if the matching succeeds, determining whether the user identity authentication duration exceeds the expiration time threshold; if the user identity authentication duration is within its validity, the authentication succeeds", the user identity authenticating method for preventing malicious harassment further includes:

Step 123: sending an identity authentication acknowledgment SMS to a user mobile phone number;

Step 124: according to an acquired acknowledgment information replied by the user, associating and storing the user mobile phone number with the unique session identifier of the identity authentication, and sending an identify authentication success SMS to the user mobile phone number.

In step 124, when the user needs to check on the website page the mobile phone number which has been authenticated at present and when the user sends a check request to the server backend, the request will include a session identifier corresponding to the user mobile phone number. The server backend will acquire the user mobile phone number from an authentication code information storage module according to the session identifier, and return the user mobile phone number to display it on the website page.

Figure 2:
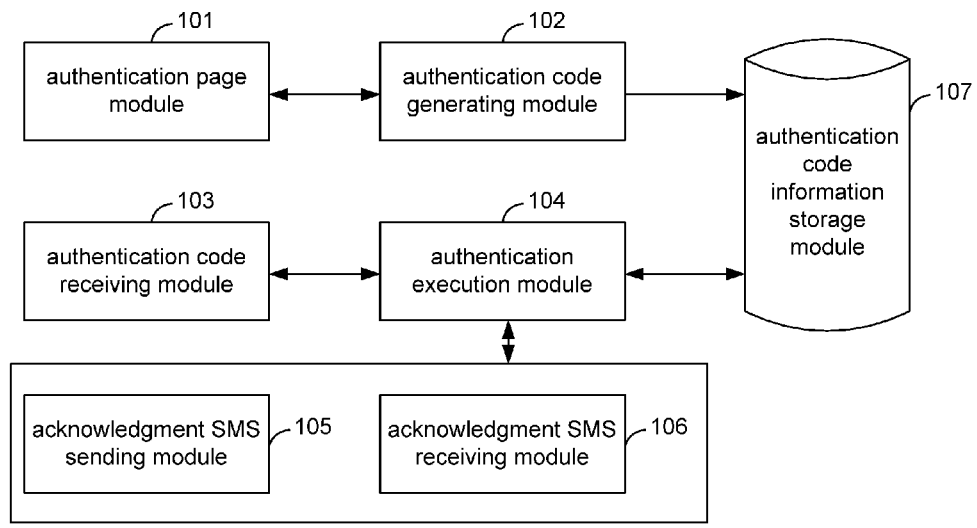
FIG. 2 is a structural diagram of a user identity authenticating device for preventing malicious harassment in an embodiment of the disclosure.

As shown in FIG. 2, an embodiment of the disclosure further provide a user identity authenticating device for preventing malicious harassment, which includes:

an authentication page module 101, configured to provide an internet website page for a user; and to display first authentication code information acquired from an authentication code generating module 102 and an SMS UL service number used for identifying the internet website uniquely on the website page, e.g. in a preferred embodiment, a method for displaying the first authentication code information on the website page by the authentication page module 101 includes: displaying the first authentication code information in the form of a text or displaying the first authentication code information in the form of a QR code image;

the authentication code generating module 102, which is configured, after the user logs in the internet website, to generate the unique first authentication code information and to store it;

an authentication code receiving module 103, which is configured, after the user sends an SMS to the corresponding SMS UL service number, wherein the SMS includes second authentication code information input by the user, to acquire the second authentication code information fed back by the user;

an authentication execution module 104, which is configured to match the acquired second authentication code information with a stored first authentication code, if the matching succeeds, the authentication succeeds.

In a preferred embodiment, the step of generating the unique first authentication code information and storing it by the authentication code generating module 102 after the user logs in the internet website includes:

(1) after the user logs in the internet website, generating a unique session identifier accordingly and putting it into website Cookie, and generating an authentication code request command;

(2) according to the command, the session identifier, a preset expiration time threshold and an authentication code request command serial number, generating the unique first authentication code based on an authentication code generating algorithm, and storing the first authentication code together with the corresponding session identifier and the expiration time threshold information.

In a preferred embodiment, after the user inputs the second authentication code information manually according to display information on the website page or inputs the second authentication code information according to scanning the QR code image, and after the user sends an SMS including the second authentication code information to the corresponding SMS UL service number, the authentication code receiving module acquires the second authentication code information fed back by the user;

and the step of matching the acquired second authentication code with the stored first authentication code by the authentication execution module 104 includes:

(1) matching the second authentication code with the stored first authentication code, if the matching succeeds, determining whether a user identity authentication duration exceeds the expiration time threshold; if the user identity authentication duration is within its validity, the authentication succeeds.

In an embodiment of the disclosure and in a more preferred embodiment, the user identity authenticating device for preventing malicious harassment further includes:

an acknowledgment SMS sending module 105, which is configured, after the identity authentication succeeds, to send an identity authentication acknowledgment SMS to a user mobile phone number; and after an acknowledgment SMS receiving module 106 acquires the acknowledgment SMS information from the user, to send an identify authentication success SMS to the user mobile phone number;

the acknowledgment SMS receiving module 106, which is configured to acquire the acknowledgment information replied by the user, and to associate and store the user mobile phone number with the unique session identifier of the identity authentication.

when the user needs to check on the website page the mobile phone number which has been authenticated at present and when the user sends a check request to the server backend, the request will include a session identifier corresponding to the user mobile phone number. The server backend will acquire the user mobile phone number from an authentication code information storage module 107 according to the session identifier, and return the user mobile phone number to display it on the website page.

In an embodiment of the disclosure, the user identity authenticating device for preventing malicious harassment further includes:

an authentication code information storage module 107, which is configured, on one hand, to store the first authentication code information after the user logs in the internet website, the corresponding session identifier, and the expiration time threshold information, and further configured to record an association relationship between the user mobile phone number, the corresponding session identifier and the expiration time threshold information.

It needs to be noted that, the authentication page module 101, the authentication code generating module 102, the authentication code receiving module 103, the authentication execution module 104, the acknowledgment SMS sending module 105 and the acknowledgment SMS receiving module 106 may be implemented by a Central Processing Unit (CPU), a Digital Signal Processor (DSP) or a Field- Programmable Gate Array (FPGA) in the server, and the authentication code information storage module 107 may be implemented by a hard disk or other hardware storage devices.

To further describe an implementation process of a user identity authenticating device for preventing malicious harassment in an embodiment of the disclosure, detailed description will be given below with reference to FIG. 2 and FIG. 3, and the specific implementation process is as follows:

Step 21: an authentication page module 101 is configured to provide a website page for mobile phone number authentication to an internet user; the authentication page module 101 generates, after the user logs in the internet website, a session identifier, e.g. a Universally Unique Identifier (UUID) value, and puts the session identifier in the website page Cookie;

and the authentication page module 101 acquires an authentication code from an authentication code generating module 102 and displays it, wherein after receiving an authentication code acquisition request sent from the authentication page module 101, the authentication code generating module 102 generates, according to the session identifier, an expiration time threshold (e.g. set as 10 minutes during execution) and an authentication code acquisition serial value (plus 1 during each request), a unique authentication code based on a certain authentication code generating algorithm, and stores the authentication code, the corresponding session identifier and the expiration time threshold information in an authentication code information storage module 107, wherein the authentication code generating algorithm may be implemented by various authentication code generating methods in the related art, which will not be described in details herein;

Step 22: after acquiring the authentication code, the authentication page module 101 displays the authentication code on the website page in the form of a text; during the process of displaying the authentication code, the authentication code may be also converted into a QR code image and displayed on the website page; in addition, the authentication page module 101 further provides a mobile phone SMS sending target number, i.e. a mobile phone SMS UL service number, and the internet service provider may use the number to receive an SMS sent from the user mobile phone and a mobile phone number of the sender;

Step 23: the user uses the mobile phone to input the authentication code displayed by the authentication page module 101 and sends it as an SMS content to the mobile phone SMS sending target number, during which the user may input the authentication code directly as the SMS content or may also acquire the authentication code through application software having a QR code reading function and put it in the SMS content;

Step 24: an authentication code receiving module 103 receives the authentication code sent from the user mobile phone and delivers it to an authentication execution module 104 to perform authentication;

Step 25: the authentication execution module 104 determines whether the authentication code received by the authentication code receiving module 103 exists in the authentication code information storage module 107; if yes, it determines whether the authentication code expires, and if the authentication code does not exist or expires, transmits an SMS to remind the user to acquire an authentication code again; otherwise, step 26 is performed;

Step 26: to further enhance safety and prevent malicious users from sending authentication code SMSs through some number modification software, an acknowledgement SMS may be transmitted to the user mobile phone number by an acknowledgment SMS sending module 105; under such a mode of implementation, application of the technical solution may also cause harassment to the user to some extent. However, information security can be guaranteed more effectively to some extent for the user, and legal risks can be further reduced for the internet service provider;

Step 27: the user replies an acknowledgment SMS with the mobile phone;

Step 28: after an acknowledgment SMS receiving module 106 receives the acknowledgment SMS of the user, the user mobile phone number is associated with the corresponding session identifier through the authentication code in the authentication code information storage module 107;

Step 29: the acknowledgment SMS sending module 105 transmits a feedback SMS to remind the user that the authentication succeeds;

Step 210: when the user checks, on the website page, the mobile phone number which has been authenticated at present and when the user sends a check request to the server backend, the check request includes the corresponding session identifier; then the server backend will acquire the corresponding mobile phone number in the authentication code information storage module 107 according to the session identifier and return the mobile phone number to the website page to be checked by the user;

Step 211: end.

What are described above are only preferred embodiments of the disclosure and are not to limit the patent scope of the disclosure thereto. All equivalent structures or equivalent process changes made by utilizing the description and the accompanying drawings of the disclosure, or the direct or indirect applications thereof in other relevant technical fields, are within the patent protection scope of the disclosure in the similar way.

The invention claimed is:

1. A user identity authenticating method for preventing malicious harassment, comprising:
    after a user logs into an internet website, generating unique first authentication code information and storing it; wherein the first authentication code information contains a unique first authentication code;
    displaying the first authentication code information and a Short Message (SMS) Uplink (UL) service number used for identifying the internet website uniquely on a website page;
    after the user acquires second authentication code information based on display information on the website page and sends the second authentication code information through an SMS by using a user mobile phone to the corresponding SMS UL service number, acquiring a unique second authentication code from the second authentication code information, and matching the acquired second authentication code with the stored first authentication code; if the matching succeeds, then the authentication succeeds and a phone number of the user mobile phone is registered.

2. The user identity authenticating method for preventing malicious harassment according to claim 1, wherein the generating the unique first authentication code information and storing it after the user logs in the internet website comprises:
    after the user logs in the internet website, generating a unique session identifier accordingly and putting it into website Cookie, and generating an authentication code request command;

according to the command, the session identifier, a preset expiration time threshold and an authentication code request command serial number, generating the unique first authentication code based on an authentication code generating algorithm, and storing the first authentication code together with the corresponding session identifier and the expiration time threshold information.

3. The user identity authenticating method for preventing malicious harassment according to claim 2, wherein the displaying the first authentication code information on the website page comprises: displaying the first authentication code information in the form of a text, or in the form of a Quick Response (QR) code image.

4. The user identity authenticating method for preventing malicious harassment according to claim 1, wherein after the user sends the SMS including the second authentication code information input by the user to the corresponding SMS UL service number, the matching the acquired second authentication code with the stored first authentication code comprises:
 after the user inputs the second authentication code information manually according to display information on the website page or inputs the second authentication code information according to scanning the QR code image, sending the SMS including the second authentication code information to the corresponding SMS UL service number;
 matching the second authentication code with the stored first authentication code, if the matching succeeds, determining whether a user identity authentication duration exceeds the expiration time threshold; if the user identity authentication duration is within its validity, the authentication succeeds.

5. The user identity authenticating method for preventing malicious harassment according to claim 4, further comprising:
 sending an identity authentication acknowledgment SMS to the phone number of the user mobile phone;
 according to acquired acknowledgment information replied by the user, associating and storing the phone number of the user mobile phone with the unique session identifier of the identity authentication, and sending an identify authentication success SMS to the phone number of the user mobile phone.

6. A user identity authenticating device for preventing malicious harassment, comprising:
 a memory storing instructions;
 a first processor, which is configured to provide an internet website page for a user; and to display first authentication code information acquired from a second processor and a Short Message (SMS) Uplink (UL) service number used for identifying the internet website uniquely on the website page;
 the second processor, which is configured, after the user logs into the internet website, to generate a unique first authentication code information and to store it; wherein the first authentication code information contains a unique first authentication code;
 a third processor, which is configured to, after the user acquires second authentication code information based on display information on the website page and sends the second authentication code information through an SMS by using a user mobile phone to the corresponding SMS UL service number, acquire a unique second authentication code from the second authentication code information fed back by the user;
 a fourth processor, which is configured to match the acquired second authentication code with the stored first authentication code, if the matching succeeds, the authentication succeeds and a phone number of the user mobile phone is registered.

7. The user identity authenticating device for preventing malicious harassment according to claim 6, wherein the second processor is further configured,
 after the user logs in the internet website, to generate a unique session identifier accordingly and put it into website Cookie, and to generate an authentication code request command;
 according to the command, the session identifier, a preset expiration time threshold and an authentication code request command serial number, to generate the unique first authentication code based on an authentication code generating algorithm, and to store the first authentication code together with the corresponding session identifier and the expiration time threshold information.

8. The user identity authenticating device for preventing malicious harassment according to claim 7, wherein the displaying the first authentication code information on the website page by the first processor comprises: displaying the first authentication code information in the form of a text, or in the form of a QR code image.

9. The user identity authenticating device for preventing malicious harassment according to claim 6, wherein
 after the user inputs the second authentication code information manually according to display information on the website page or inputs the second authentication code information according to scanning the QR code image, and sends the SMS including the second authentication code information to the corresponding SMS UL service number, the third processor is configured to acquire the second authentication code information fed back by the user;
 and the fourth processor is further configured to match the second authentication code with the stored first authentication code, if the matching succeeds, to determine whether a user identity authentication duration exceeds the expiration time threshold; if the user identity authentication duration is within its validity, the authentication succeeds.

10. The user identity authenticating device for preventing malicious harassment according to claim 9, further comprising:
 a fifth processor, which is configured, after the identity authentication succeeds, to send an identity authentication acknowledgment SMS to the phone number of the user mobile phone; and after a sixth processor acquires acknowledgment information replied by the user, to send an identify authentication success SMS to the phone number of the user mobile phone;
 the sixth processor, which is configured to acquire the acknowledgment information replied by the user, and to associate and store the phone number of the user mobile phone with the unique session identifier of the identity authentication.

11. The user identity authenticating method for preventing malicious harassment according to claim 2, wherein after the user sends the SMS including the second authentication code information input by the user to the corresponding SMS UL service number, the matching the acquired second authentication code with the stored first authentication code comprises:
 after the user inputs the second authentication code information manually according to display information on the website page or inputs the second authentication code information according to scanning the QR code image, sending the SMS including the second authentication code information to the corresponding SMS UL service number;

matching the second authentication code with the stored first authentication code, if the matching succeeds, determining whether a user identity authentication duration exceeds the expiration time threshold; if the user identity authentication duration is within its validity, the authentication succeeds.

12. The user identity authenticating method for preventing malicious harassment according to claim 3, wherein after the user sends the SMS including the second authentication code information input by the user to the corresponding SMS UL service number, the matching the acquired second authentication code with the stored first authentication code comprises:

after the user inputs the second authentication code information manually according to display information on the website page or inputs the second authentication code information according to scanning the QR code image, sending the SMS including the second authentication code information to the corresponding SMS UL service number;

matching the second authentication code with the stored first authentication code, if the matching succeeds, determining whether a user identity authentication duration exceeds the expiration time threshold; if the user identity authentication duration is within its validity, the authentication succeeds.

13. The user identity authenticating method for preventing malicious harassment according to claim 11, further comprising:

sending an identity authentication acknowledgment SMS to the phone number of the user mobile phone;

according to acquired acknowledgment information replied by the user, associating and storing the phone number of the user mobile phone with the unique session identifier of the identity authentication, and sending an identify authentication success SMS to the phone number of the user mobile phone.

14. The user identity authenticating method for preventing malicious harassment according to claim 12, further comprising:

sending an identity authentication acknowledgment SMS to the phone number of the user mobile phone;

according to acquired acknowledgment information replied by the user, associating and storing the phone number of the user mobile phone with the unique session identifier of the identity authentication, and sending an identify authentication success SMS to the phone number of the user mobile phone.

15. The user identity authenticating device for preventing malicious harassment according to claim 7, wherein after the user inputs the second authentication code information manually according to display information on the website page or inputs the second authentication code information according to scanning the QR code image, and sends the SMS including the second authentication code information to the corresponding SMS UL service number, the third processor is configured to acquire the second authentication code information fed back by the user;

and the fourth processor is further configured to match the second authentication code with the stored first authentication code, if the matching succeeds, to determine whether a user identity authentication duration exceeds the expiration time threshold; if the user identity authentication duration is within its validity, the authentication succeeds.

16. The user identity authenticating device for preventing malicious harassment according to claim 8, wherein after the user inputs the second authentication code information manually according to display information on the website page or inputs the second authentication code information according to scanning the QR code image, and sends the SMS including the second authentication code information to the corresponding SMS UL service number, the third processor is configured to acquire the second authentication code information fed back by the user;

and the fourth processor is further configured to match the second authentication code with the stored first authentication code, if the matching succeeds, to determine whether a user identity authentication duration exceeds the expiration time threshold; if the user identity authentication duration is within its validity, the authentication succeeds.

17. The user identity authenticating device for preventing malicious harassment according to claim 15, further comprising:

a fifth processor, which is configured, after the identity authentication succeeds, to send an identity authentication acknowledgment SMS to the phone number of the user mobile phone; and after a sixth processor acquires acknowledgment information replied by the user, to send an identify authentication success SMS to the phone number of the user mobile phone;

the sixth processor, which is configured to acquire the acknowledgment information replied by the user, and to associate and store the phone number of the user mobile phone with the unique session identifier of the identity authentication.

18. The user identity authenticating device for preventing malicious harassment according to claim 16, further comprising:

a fifth processor, which is configured, after the identity authentication succeeds, to send an identity authentication acknowledgment SMS to the phone number of the user mobile phone; and after a sixth processor acquires acknowledgment information replied by the user, to send an identify authentication success SMS to the phone number of the user mobile phone;

the sixth processor, which is configured to acquire the acknowledgment information replied by the user, and to associate and store the phone number of the user mobile phone with the unique session identifier of the identity authentication.

* * * * *